United States Patent
Melles

(10) Patent No.: US 12,447,214 B2
(45) Date of Patent: *Oct. 21, 2025

(54) STAINING COMPOSITION WITH IMPROVED STAINING INTENSITY

(71) Applicant: D.O.R.C. Dutch Ophthalmic Research Center (International) B.V., Zuidland (NL)

(72) Inventor: Gerrit Reinold Jacob Melles, Rotterdam (NL)

(73) Assignee: D.O.R.C. Dutch Ophthalmic Research Center (International) B.V., Zuidland (NL)

( * ) Notice: Subject to any disclaimer, the term of this patent is extended or adjusted under 35 U.S.C. 154(b) by 1476 days.

This patent is subject to a terminal disclaimer.

(21) Appl. No.: 16/615,958

(22) PCT Filed: May 24, 2018

(86) PCT No.: PCT/NL2018/050342
§ 371 (c)(1),
(2) Date: Nov. 22, 2019

(87) PCT Pub. No.: WO2018/217088
PCT Pub. Date: Nov. 29, 2018

(65) Prior Publication Data
US 2020/0093941 A1    Mar. 26, 2020

(30) Foreign Application Priority Data

May 24, 2017   (NL) ..................................... 2018976

(51) Int. Cl.
| | | |
|---|---|---|
| A61K 49/00 | (2006.01) | |
| A61F 2/16 | (2006.01) | |
| A61F 9/007 | (2006.01) | |
| C09B 67/44 | (2006.01) | |

(52) U.S. Cl.
CPC .......... *A61K 49/006* (2013.01); *A61F 2/1662* (2013.01); *A61F 9/00754* (2013.01); *C09B 67/0083* (2013.01)

(58) Field of Classification Search
CPC .............. A61K 49/006; A61K 49/0073; A61F 2/1662; A61F 9/00754; C09B 67/0083; A61P 41/00
See application file for complete search history.

(56) References Cited

FOREIGN PATENT DOCUMENTS

| EP | 2620144 A1 | 7/2013 | |
|---|---|---|---|
| WO | WO-9632929 A1 * | 10/1996 | ........... A61K 9/0048 |
| WO | 2006133903 A2 | 12/2006 | |

OTHER PUBLICATIONS

Hersh, Cataract Surgery, OPHTHALM. Oct. p. 123 (Year: 1999).*
Awad, Brilliant Blue G, Gra. Arch Clin Exp Ophthalmol April p. 1735 (Year: 2013).*
"Trypan-Blue-Stained Viscoelastic Material for Ophthalmic Surgery", Sep. 1, 2002 (Sep. 1, 2002), XP055121191, Retrieved from the Internet: URL:http//www.sciencedirect.com/science/article/pii/SO8856934385/00201pdff?tmd=a95fdd413aae8ad4c527tb2a7c457f82&pid1=-s2.0S0886335002150948-mani.pdf [retrieved on Jun. 3, 2014].
Frank Schuettauf et al: "Administration of Novel Dyes for Intraocular Surgery: An In Vivo Toxicity Animal Study", Investigative Ophthalmology & Visual Science, vol. 47, No. 8, Aug. 2006 (Aug. 2006), p. 3573, XP055442807.
Haritoglou Christos et al: "Short-term in vivo evaluation of novel vital dyes for intraocular surgery",Retina, vol. 26, No. 6, Jul. 2006 (Jul. 2006), pp. 673-678, XP009502957.
Ozcan Kayikicioglu et al: "Trypan blue mixed with sodium hyaluronate for capsulorhexis", Journal Cataract and Refractive Surgery, vol. 27, No. 7, 2001, p. 970, XP002966591.
Schumann Ricarda G. et al: Vital Dyes for Macular Surgery A Comparative Electron Microscopy Study of the Internal Limiting Membrane, Retina, vol. 29, No. 5 , May 2009 (May 2009), pp. 669-676, XP009502956.

* cited by examiner

Primary Examiner — Sarah Alawadi
Assistant Examiner — Thurman Wheeler
(74) Attorney, Agent, or Firm — Banner & Witcoff, Ltd.

(57) ABSTRACT

A staining composition is provided with improved staining intensity. The composition comprises a vital dye and hyaluronic acid, wherein the vital dye comprises Chicago Sky Blue and Trypan Blue. The staining composition is used to stain the lens capsule during cataract surgery and provides sufficient contrast such that no air bubble needs to be injected in the anterior chamber during cataract surgery.

12 Claims, 7 Drawing Sheets

STAINING COMPOSITION WITH IMPROVED STAINING INTENSITY

RELATED APPLICATIONS

This application is a National Stage Application under 35 U.S.C. 371 of co-pending PCT application PCT/NL2018/050342 designating the United States and filed May 24, 2018; which claims the benefit of NL application number 2018976 and filed May 24, 2017 each of which are hereby incorporated by reference in their entireties.

The invention is directed to a staining composition, a method for preparing the staining composition and to the use of the staining composition in staining ocular tissue as part of ocular surgery, in particular cataract surgery.

A cataract may develop due to aging or to a wide variety of ocular or systemic pathological disorders or diseases. When a cataract develops, the lens substance becomes less transparent.

To restore the optical pathway, cataract surgery may be performed to remove the opaque lenticular mass. In cataract surgery, the opaque (cataract) lens of the eye is removed and replaced with a synthetic intraocular lens (IOL).

In cataract surgery, the anterior chamber of the eye is opened through a peripheral corneal, limbal or scleral incision, the anterior lens capsule is opened, and the lens substance is removed (e.g. using phacoemulsification), while leaving the peripheral rim of the anterior lens capsule as well as the capsular equatorial and posterior portions in-situ. The empty lens capsule forms a capsular 'bag' that can be used to support the synthetic intraocular implant lens (IOL), so that an IOL is positioned 'in the bag'.

During cataract surgery, the technique of capsulorhexis is used to prevent unintentional tearing of the peripheral anterior capsular rim during the surgical manipulations required to open the anterior chamber. In capsulorhexis, a continuous curvilinear tear is made to create a round opening in the anterior capsule of the lens. It is used to remove the lens capsule during cataract surgery by shear and stretch forces. The purpose of capsulorhexis is to open the capsule without a radial tear which might at any time, either during or after the operation, extend and allow the contents of the bag to shift.

In order to stabilize the anterior chamber a viscoelastic material is injected into the anterior chamber to help maintain its shape during the surgery. This viscoelastic material is typically made from substances that occur naturally in the body. Because of its high viscosity, material will not leak out of the incisions during surgery. The viscoelastic material maintains a chamber with sufficient volume during cataract surgery and thereby allows for more efficient manipulation with less trauma to the corneal endothelium and other ocular tissues. The viscoelasticity of the material helps the vitreous surface to be pushed back, thus preventing formation of a postoperative flat anterior chamber.

To facilitate cataract surgery, staining methods may be used to selectively stain the outer surface of the anterior lens capsule, while the lenticular material beneath the anterior lens capsule (i.e. the lens fibers and in particular the outer lens cortex) is not noticeably stained. In this way, the lens capsule can be visually distinguished from the outer lens cortex. This distinction reduces the risk of inadvertently damaging or even removing the lens capsule during cataract surgery, especially during removal of the lens. A typical surgical handling required for efficient staining is that before injecting the staining solution onto the lens capsule, first an air bubble is injected into the anterior chamber. The air bubble allows for a more direct contact of the staining solution and helps to prevent, or at least reduce, undesirable dilution of the staining solution which would result in a too faint contrast.

Such a staining method is known from WO 99/58160, which describes a method for performing capsulorhexis, wherein a lens capsule of an eye is stained using at least one dye, which dye is capable of staining tissue without diffusing through said tissue. Trypan blue is mentioned as an example of a suitable dye.

According to the method of WO 99/58160, the ocular fluid may first be aspirated and the anterior chamber filled with air (i.e. an air bubble). A few drops of the solution comprising the dye are applied onto the anterior lens capsule. The application of the solution may be carried out by bringing a cannula that is attached to a syringe containing the dye into the anterior chamber, and to inject a few drops of the dye, generally less than 1 ml (in practice less than 0.5 ml), onto the anterior lens capsule. The anterior chamber is filled with air, so that the concentration of the dye in the solution is not lowered by the ocular fluid. As an alternative, WO 99/58160 describes that the dye can be administered in a higher concentration into the aqueous, or a dispersion of the dye in a viscous or viscoelastomeric solution can be used. Preferably, the excess dye is washed out by irrigating the anterior chamber, leaving a faint but clear staining of the anterior lens capsule, after which the surgery can be continued using routine techniques.

The staining methods that are currently applied in cataract surgery, including the method of WO 99/58160, have a number of disadvantages.

First, known staining methods require that an air bubble is applied in the anterior chamber. Without the air bubble, the distinction between the stained lens capsule and the outer lens cortex is not sufficient to effectively take advantage of the contrast provided by the staining. It will be evident that cataract surgery would be less complex if such a step would not have to be conducted.

Second, a disadvantage of the staining methods known in the art is that they do not manage to stain the lens capsule for a sufficient amount of time. The staining provided to the lens capsule tends to fade away over time during surgery. As a result, during the last part of surgery, there is no longer a clear distinction in color between the lens capsule and lens cortex. Accordingly, there is a need for staining compositions that provide staining with an increased duration.

Third, there is a need for staining methods with improved contrast, such as to further reduce the risk of inadvertently damaging the lens capsule during cataract surgery. Accordingly, there is a need for staining compositions that provide staining with an increased intensity.

EP 2 620 144 describes a staining composition comprising a vital dye and an anaesthetic for both staining and anaesthesia of ocular tissue.

Schumann et al. (Retina, the journal of retinal and vitreous diseases 2009, vol. 29, number 5, pages 669-676) describe staining of a removed internal limiting membrane using a vital dye such as trypan blue, brilliant blue G, bromophenol blue, Chicago blue and indocyanine green in macular hole surgery.

Viscoelastic dyes comprising a dye compound and hyaluronic acid are described in EP 1 132 065. Such viscoelastic dyes are injected into the anterior chamber of the eye and are not intended to stain ocular tissue.

An object of the invention is to provide a staining composition that solves one or more of the problems mentioned above.

This object is achieved by providing a staining composition comprising a vital dye and hyaluronic acid, wherein the vital dye comprises Chicago Sky Blue and Trypan Blue, and wherein further hyaluronic acid is present.

When using the staining composition according to the invention for staining the lens capsule in cataract surgery, the inventors found that the composition was able to stain the lens capsule with an increased intensity and increased duration. Even at the end of the surgery, there was still a good visibility of the rim of the capsular bag, facilitating a proper placement of the IOL. The inventors further found that the staining composition according to the invention even provided sufficient contrast when no air bubble was injected in the anterior chamber. Thus, the invention makes it possible to eliminate a surgical step from cataract surgery. The clinical results are described in more detail in Example 6.

With respect to the increased staining intensity, the inventors found a synergistic effect of the dye combination of Chicago Sky Blue and Trypan Blue. This particular dye combination provided superior staining compared to other dye combinations, as shown in Examples 1 and 3. Absorbance measurements were conducted which showed that the absorbance at a wavelength of 500-610 nm was higher for the combination of these two dyes compared to the sum of the absorbance measured for the two individual dyes. Further, a shift in the absorbance maximum was observed to a lower wavelength. The experimental results are described in more detail in Examples 2, 3 and 5. It is hypothesized that the change in absorbance and absorbance maximum is caused by interaction of the two dye molecules in solution. Since a wavelength of 500-610 nm corresponds to the wavelength range for which the human eye is most sensitive, the higher absorbance and shift in absorbance maximum is perceived as an increased intensity of the two dyes. The inventors further found that the presence of hyaluronic acid strengthened this effect on absorbance. In staining tests conducted with bovine and human eyes, hyaluronic acid did not have any noticeable negative effect on staining intensity. This was in contrast with other polymers that were tested, which included polyethylene glycol (PEG), (hydroxypropyl) methyl cellulose (HPMC), polyvinyl alcohol (PVA) and polyvinylpyrrolidone (PVP). These polymers all caused a significant reduction in staining intensity, even to such an extent that the staining intensity was too low to provide a clinically usable contrast, as shown in Example 4.

Figure 1:
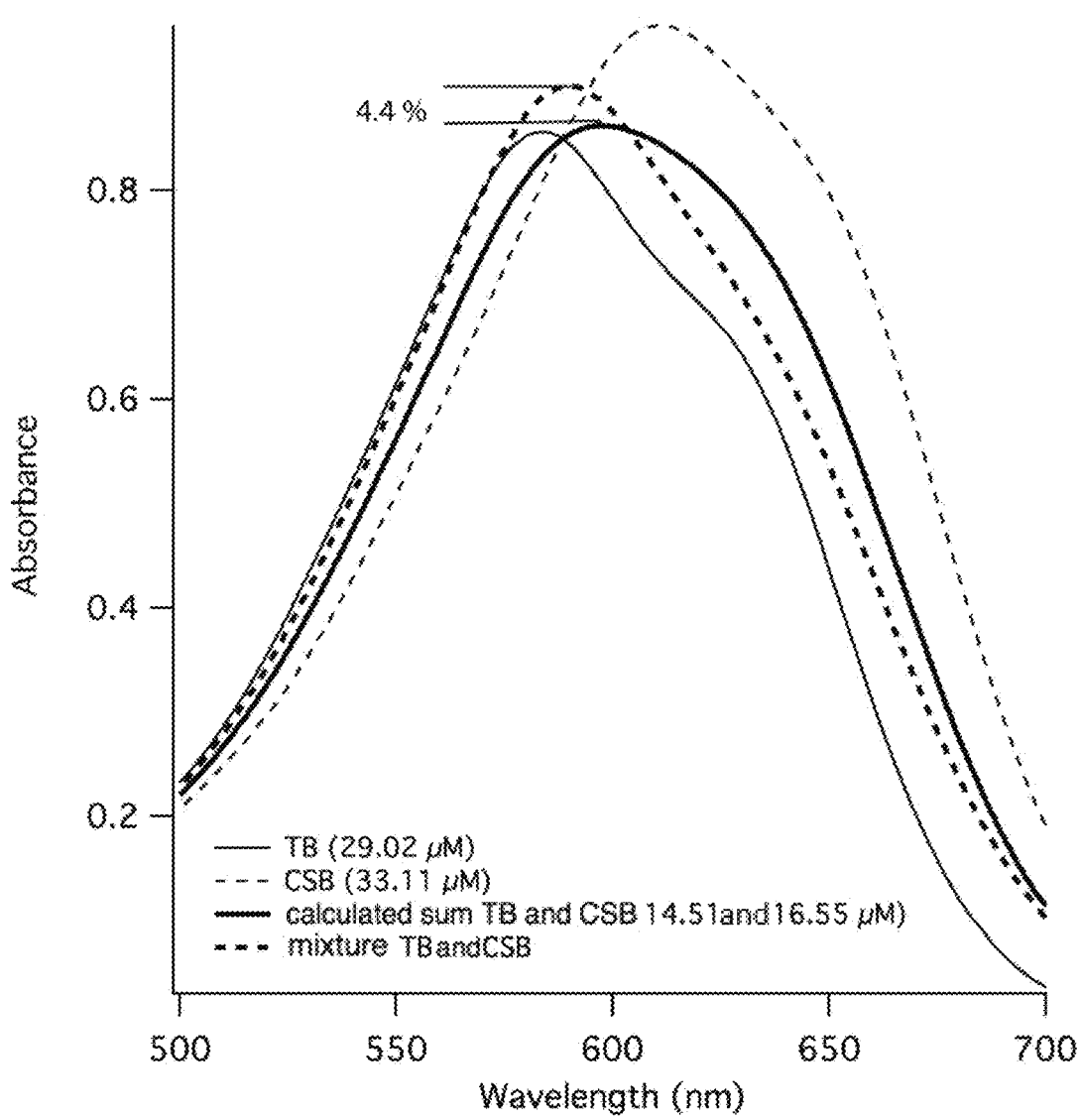
FIGS. 1-6 show absorbance spectra measured for different staining compositions, as discussed in Examples 2-4.

The specific details of the staining composition according to the invention are described below.

The staining composition according to the invention is preferably a liquid, which is an appropriate form when using the composition in surgery. The staining composition is typically an aqueous liquid preferably an aqueous solution. Both the dyes and hyaluronic acid are soluble in water.

The staining composition comprises hyaluronic acid. Hyaluronic acid is a naturally occurring high viscosity glycosaminoglycan having alternating 1-4 glucosaminidic bonds. The molecular weight of this material is generally within the range of 50,000 to 8,000,000 g/mole, although there are reports of molecular weights as high as 13,000,000 g/mole depending on the source, method of isolation and method of determination. After isolating hyaluronic acid from its source, treatments are known that reduce the molecular weight of hyaluronic acid. Accordingly, hyaluronic acid of a lower molecular weight can also be used in the staining composition of the invention, for example of 10,000 to 50,000 g/mole. The zero-shear viscosity of hyaluronic acid generally varies from 50,000 to 10,000,000 centipoise. Good results have been obtained using hyaluronic acid with a molecular weight of between 100,000 to 5,000,000 Da, in particular with a molecular weight of between 500,000 and 3,000,000 g/mole.

Hyaluronic acid may be present in the composition in an amount of less than 3.0 wt. %, preferably less than 2 wt. %, even more preferably less than 1.0 wt. %, based on the weight of the staining composition. Higher concentrations may not be desirable in view of the high viscosity obtained with such amounts.

When using hyaluronic acid having a molecular weight between 50,000 and 8,000,000 g/mole (e.g. untreated hyaluronic acid), hyaluronic acid is preferably present in relatively low concentrations, i.e. in a concentration of less than 0.8 wt. %, based on the total weight of the composition. The inventors found that higher hyaluronic acid concentrations resulted in a composition that was difficult to handle due to amongst others a very high viscosity. Preferably, the staining composition comprises 0.2-0.75 wt. %, based on the weight of the staining composition. Good results have been obtained with a hyaluronic acid concentration of 0.3-0.7 wt. %.

Preferably, a hyaluronic acid concentration of at least 0.4 wt. %, more preferably at least 0.5 wt. %, even more preferably at least 0.6 wt. % is used, based on the total weight of the staining composition. At such high concentrations, a particular good staining duration is achieved.

Hyaluronic acid will form a salt when dissolved in an aqueous environment. Accordingly, hyaluronic acid may be present in the staining composition in its ionic form, called hyaluronate. For example, the staining composition may comprise hyaluronic acid as a salt of sodium, potassium or ammonium. Hyaluronic acid may also be present in undissolved or neutral state.

The staining composition further comprise two dye compounds, viz. Trypan Blue and Chicago Sky Blue. Chicago Sky Blue is also known as Chicago Sky Blue 6B, Direct Blue 1 or Pontamine Sky Blue.

The weight ratio of Trypan Blue to Chicago Sky Blue in the composition may be between 1:3 and 3:1. Good results have been obtained using more Trypan Blue than Chicago Sky Blue, i.e. a weight ratio of more than 1:1. Nevertheless, when more Chicago Sky Blue is present than Trypan Blue (i.e. a weight ratio of less than 1:1), the increase in staining intensity is still significant compared to known dyes or dye combinations.

In one embodiment, the weight ratio of Trypan Blue to Chicago Sky Blue may be 1:2 or more. In another embodiment, the weight ratio of Trypan Blue to Chicago Sky Blue be 2:1 or less.

The amount of Trypan Blue present in the dye composition may be in the range of 0.001-0.5 wt. %, preferably in the range of 0.01-0.2 wt. %, even more preferably in the range of 0.02-0.1 wt. %, even more preferably in the range of 0.03-0.08 wt. %, based on the total weight of the composition. The dyes may be toxic at too high concentrations. Too small amounts of dye may not result in sufficiently intense staining.

The amount of Chicago Sky Blue present in the dye composition may be in the range of 0.001-0.5 wt. %, preferably in the range of 0.01-0.2 wt. %, even more preferably in the range of 0.02-0.1 wt. %, even more preferably in the range of 0.03-0.08 wt. %, based on the total weight of the composition. The dyes may be toxic at too high concentrations. Too small amounts of dye may not result in sufficiently intense staining.

The combined concentration of Trypan Blue and Chicago Sky Blue in the staining composition may lie in the range of 0.002-1 wt. %, preferably in the range of 0.01-0.5 wt. %, more preferably in the range of 0.02-0.2 wt. %, even more preferably in the range of 0.04-0.1 wt. %. The combined concentration refers to the sum of the Trypan Blue concentration and the Chicago Blue concentration. The dyes may be toxic at too high concentrations.

Preferably, Chicago Sky Blue and Trypan Blue are the only dyes present in the composition. Nevertheless, it is possible to include one or more further dye compounds in the staining composition, in addition to Chicago Sky Blue and Trypan Blue. Such a dye compound is preferably present in an amount equal to less than half of the total dye amount present in the composition. For example, the staining composition may comprise a further dye compound selected from the group consisting of methylene blue (MB), brilliant blue G (BBG), brilliant blue R (BBR), patent blue V, trypan red, brilliant cresyl blue, indocyanine green, light green SF yellowish (LG), phenol red, chlorophenol red-beta-D-galactopyranoside (CPRG), rose bengal (4,5,6,7-tetrachloro-2',4', 5',7'-tetraiodofluoreseein), phloxine B and safranin.

The total dye concentration in the staining composition may lie in the range of 0.001-2 wt. %, preferably in the range of 0.01-0.5 wt. %, more preferably in the range of 0.04-0.2 wt. %. Within this range, the concentration may be adapted to the toxicity and coloring characteristics of the additional dye used. It is preferred that such an amount is chosen such that an optimal staining effect and intensity is achieved, while at the same time the risk of possible damage to the eye or any part thereof due to the toxicity of the dye is minimized.

Besides hyaluronic acid, the staining composition preferably does not comprise significant amounts of viscosity increasing compounds. Such compounds may negatively affect the increased staining intensity, especially in case of polymers such as polyethylene glycol (PEG). Accordingly, the staining composition is preferably essentially free of such compounds. In case the staining composition comprises a viscosity increasing compound other than hyaluronic acid, said viscosity increasing compound is preferably present in amount less than 0.5 wt. %, more preferably less than 0.1 wt. %, even more preferably less than 0.05 wt. %, based on the total weight of the staining composition. Moreover, the viscosity increasing compounds selected from polymers, such as polysaccharides, polynucleotides, proteins and synthetic polymers (such as acrylic acid polymers, methacrylic acid polymers). More specific examples of suitable viscosity increasing compounds are polyethylene glycol (PEG), (hydroxypropyl)methyl cellulose (HPMC), polyvinyl alcohol (PVA) and polyvinylpyrrolidone (PVP), chondroitin sulfate, alginic acid, cellulose and cellulose derivatives may each individually and independently from each other be present in an amount less than 0.5 wt. %, preferably less than 0.1 wt. %, more preferably less than 0.05 wt. %.

The viscosity of the staining composition is preferably at least 2.0 mPa·s, more preferably at least 5.0 mPa·s, even more preferably at least 8.0 mPa·s. Furthermore, the viscosity of the staining composition is preferably less than 150 mPa·s, more preferably less than 50 mPa·s, even more preferably less than 20 MPa·s. The viscosity as used herein in particular refers to the dynamic viscosity. As a result of the presence of the hyaluronic acid, the staining composition is typically a shear thinning liquid. This means that the viscosity of the liquid composition according to the invention increases when the shear rate increases. Viscosity values were determined using a rheometer at a temperature of 298 K and at a shear rate in the range of 1000-2000 $s^{-1}$, e.g. at 1500 $s^{-1}$.

The staining composition may further comprise a salt. The liquid staining composition is preferably isotonic with ocular fluid. For this purpose, the liquid staining composition may comprise a salt to adjust its osmolarity to a suitable value. The staining composition of the invention preferably has an osmolarity between 250 and 400 mOsm/L, preferably 300-330 mOsm/L, for example 315 mOsm/L. The skilled person will be able to calculate the amount of salt needed to achieve this.

The salt may be chosen from the group consisting of sodium chloride, potassium chloride, calcium chloride, magnesium chloride, or a combination thereof. To provide the staining composition with a salt, the staining composition may comprise a salt solution. Suitable examples are Balanced salt solution or Hartmann's lactated Ringer's solution (see also Nuijts R M M A, Edelhauser H F, Holley G P, "Intraocular irrigating solutions: a comparison of Hartmann's lactated Ringer's solution, BSS and BSS plus", Clin. Exp. Ophtamol., vol. 233 (1995), pp. 655-661).

It is further preferred that the liquid staining composition has a neutral or slightly basic pH, i.e. a pH of 6.5-8. Preferably, the composition has a pH of 7.2-7.7. To maintain a stable pH, the staining composition may comprise a buffer, preferably a salt buffer, which has the properties to be of use in ophthalmic applications. An example of a suitable buffer is phosphate buffered NaCl.

Each component in the staining composition preferably has a concentration in the staining composition that is physiologically and toxicologically acceptable. In other words, the minimum amount of each component in the staining composition should be sufficiently low such that no, or hardly any, adverse toxic effects occur. Preferably, each component in the staining composition is not, or at least hardly, toxic for the ocular structures. It is further preferred, that the content of each component in the staining composition present in the eye, shortly after the eye surgery poses hardly any risk of the patient experiencing any side-effects from the use of the staining composition.

Figure 7:
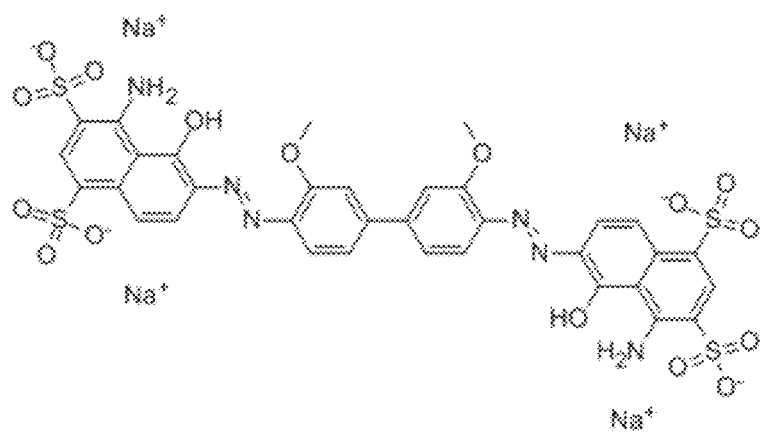
FIG. 7 shows the molecular structure of the sodium salt form of Chicago Sky Blue.
Figure 8:
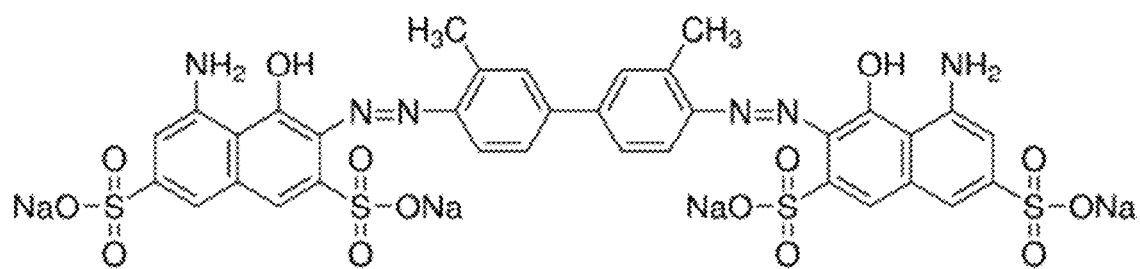
FIG. 8 shows the molecular structure of the sodium salt form of Trypan Blue.

Chicago Sky Blue and Trypan Blue are typically present in the composition in their anionic form. Typically, one and preferably both of Chicago Sky Blue and Trypan Blue are provided as a sodium salt in the composition. The molecular structure of the sodium salt form of Chicago Sky Blue is provided in FIG. 7. The molecular structure of the sodium salt form of Trypan Blue is provided in FIG. 8. Other salts can be used as well, such as e.g. potassium or ammonium salts.

The staining composition according to the invention can be prepared in a method comprising dissolving Trypan Blue, Chicago Sky Blue and hyaluronic acid in a liquid, in particular an aqueous liquid. The vital dye and density increasing compound used in the method of the invention are as described hereinabove. The liquid used in the method of the invention is preferably chosen from the group consisting of water, a salt solution or a buffer, such as a salt buffer. Examples of suitable salt solutions or buffers are described hereinabove. The method may further comprise dissolving and/or dispersing additional components in the liquid, such as those components described for the staining composition. The method may further comprise the step of dissolving a salt in the liquid to adjust the osmolarity of the liquid to a value between 250 and 400 mosmol/L, preferably 315 mosmol/L.

The staining composition according to the invention may be used in the treatment of staining an ocular tissue or part of an ocular tissue, in particular the lens capsule. The staining treatment may be part of ocular surgery Staining of at least part of an ocular tissue may be used in many types of ocular surgery to facilitate the work of the surgeon by making it easier for him to visually distinguish one ocular tissue from the other. The staining composition is typically applied to the surface of the ocular tissue to be stained. The staining composition may then be allowed to spread through this tissue by allowing the staining composition to sink onto or penetrate the tissue, e.g. under the force of gravity.

The invention is further directed to the staining composition according to the invention for use in a method of ocular surgery comprising staining an ocular tissue or part thereof, in particular the lens capsule, and performing surgery on the stained ocular tissue or its surrounding tissue. In particular, the staining composition of the invention may be used to stain a first ocular tissue so as to distinguish it from a second ocular tissue. The first ocular tissue may be the surrounding or underlying tissue of the second tissue. Alternatively, the second ocular tissue may be the surrounding or underlying tissue of the first tissue.

The invention is in particular directed to the use of the staining composition of the invention for staining the lens capsule in cataract surgery. Such cataract surgery comprises the steps of staining the surface of the lens capsule and removing the lens. In particular, the lens is removed, while leaving the lens capsule sufficiently intact. The staining composition selectively stains the surface of the lens capsule, while the lenticular material beneath the lens capsule (i.e. the lens fibers and in particular the outer lens cortex) is not noticeably stained.

More in particular, the cataract surgery may comprise the steps of
- opening the anterior chamber of the eye; and
- optionally injecting an air bubble in the anterior chamber; and
- injecting a viscoelastic liquid in the anterior chamber; and
- staining the lens capsule; and
- creating an opening in the lens capsule; and
- removing the lens from the lens capsule, while leaving the lens capsule sufficiently intact; and
- placing a synthetic lens in the lens capsule.

The staining step may be conducted by applying the staining composition of the invention to the outer surface of the anterior lens capsule. This can be done by using a cannula or syringe, preferably a blunt cannula. The cannula or syringe can be placed upon the outer surface of the lens capsule to apply the staining composition. Sufficient staining is achieved almost immediately upon contact of the staining composition with the anterior lens capsule. After application, the staining composition can be allowed to sink onto or penetrate the lens capsule, for example for 1-30 seconds, preferably 5-15 seconds. After staining, the anterior chamber may be rinsed (e.g. with a salt solution) in order to remove any excess dye. Although the staining composition is capable of penetrating the tissue of the lens capsule, it is not capable of staining the tissue beneath the lens capsule. Thus, the outer lens cortex is not stained by this method.

The amount of staining solution used to stain the lens capsule may be in the range of 0.01 to 0.5 mL, preferably in the range of 0.1 to 0.3 mL.

The step of staining the lens capsule is typically conducted before opening the lens capsule, such as to avoid the staining composition from entering and staining tissue on the inside of the capsular bag.

The step of opening the anterior chamber of the eye is conducted by making one or more peripheral corneal, limbal or scleral incisions.

Preferably, the cataract surgery is performed without conducting the step of injecting an air bubble in the anterior chamber. With the staining compositions of the prior art, the air bubble was needed to ensure a direct contact of the dye with the tissue, such that sufficient staining was obtained. However, the intensity and duration of the staining composition according to the invention are such that this step is no longer required.

The step of injecting a viscoelastic liquid in the anterior chamber may be conducted to maintain a sufficiently large space in the anterior chamber during cataract surgery. Also, the viscoelastic liquid performs a protective function to reduce or avoid damage of the ocular tissue. At the end of the surgery, the viscoelastic liquid can be removed by rinsing, e.g. with salt solution. The viscoelastic liquid may protect the ocular tissues and to create space during the entire duration of the surgery.

The step of opening the lens capsule may be conducted by making an opening (typically of circular shape) through which the lens can be extracted. Getting access to the natural lens through the anterior capsule can be done by capsulorhexis.

The step of removing the lens from the lens capsule may be done by removing the lens as a whole or in fragments. The lens may be fragmentized by phacoemulsification. In case phacoemulsification is used, the lens is emulsified with ultrasound waves, e.g. using an ultrasonic device (typically a hand piece). The emulsified lenticular material can subsequently be aspirated from the eye. Alternatively, the lens may also be removed and/or fragmentized using laser techniques, such as femtosecond laser technology.

It is essential that the lens capsule is intact after removal of the natural lens. This means that sufficient tissue of the lens capsule shall remain such that an IOL can be placed in the lens capsule. The lens capsule remaining after removal of the lens may also be referred to as the "capsular bag".

An intraocular lens (IOL) is commonly used as the synthetic lens. Examples are silicone and acrylic lenses.

The specific type of cataract surgery performed is not particularly relevant, as staining the lens capsule is desirable regardless of specific type used. The cataract surgery used may for example be phacoemulsification (phaco), extracapsular cataract extraction (ECCE) or manual small incision cataract surgery (MSICS).

When applying the staining composition in surgery, the dye is not used to have a diagnostic or therapeutic effect. The contrast produced by staining of the tissue is only visible and/or useful in combination with the actual surgical handling, e.g. removal of the tissue. In other words, the dye is not applied onto the tissue to make or confirm a diagnosis, since the transparency of the ocular media allows medical professionals to establish the type of pathology (i.e. to come to a diagnosis) before the surgery. Also, the dye does not have any therapeutic effect and does not act as an adjuvant. The purpose of staining the tissue is merely to produce a contrast between different tissue structures during a surgical procedure.

The invention is further directed to a method for staining an ocular tissue or part thereof, comprising the steps of
applying the staining composition of the invention to the surface of the ocular tissue or part of the ocular tissue, preferably to the outer surface of the lens capsule; and
allowing the staining composition to sink onto or penetrate the ocular tissue or part of the ocular tissue.

The details for applying the staining composition may be similar as described above with respect to the use of the staining composition in cataract surgery.

The present invention will be further illustrated by the following example.

EXAMPLE 1: EFFECT OF DYE COMBINATIONS ON STAINING

Eight staining solutions were prepared with different dye combinations of Trypan Blue (TB), Chicago Sky Blue (CSB), Brilliant Blue G (BBG) and Methylene Blue (MB). The specific dye combinations and concentrations used are listed in Table 1. The amounts listed in Table 1 represent the weight amount of the dye in grams that is present in 100 mL staining solution (w/v %). Although the total dye concentration varied for the different solutions, the absorbance at the wavelength maximum ($A_{max}$) was comparable for each staining solution.

TABLE 1 composition staining solutions Example 1

| | A | B | C | D | E | F | G | H | I | J |
|---|---|---|---|---|---|---|---|---|---|---|
| TB (w/v %) | 0.06 | 0.1 | | 0.033 | 0.066 | 0.05 | 0.033 | 0.033 | | |
| CSB (w/v %) | | | 0.1 | 0.066 | 0.033 | 0.05 | | | 0.066 | 0.066 |
| BBG (w/v %) | | | | | | | 0.095 | 0.033 | | |
| MB (w/v %) | | | | | | | | | 0.024 | 0.01 |

Forty pairs of porcine cadaveric eyes were obtained less than six hours post mortem. The age of the animals was approximately six months, and lens capsules were isolated within 8 hours after death. First, debris like muscle, fat and other tissue were removed from the globe. Next, a 17.0 min corneo-scleral rim was excised from each globe, and immediately after excision of the corneo-scleral rim, the lens capsule was harvested by grasping the iris root with a forceps, separating the vitreous from the iris and lens with a surgical blade, and peeling the lens, including the iris, from the vitreous. The lens (including the iris) was stored in NaCl at room temperature until use.

Per staining solution, four porcine lens capsules were stained by immersing the lens capsule (including iris) in 2-5 ml dye solution for 10 s and washing it with PBS subsequently. For digital imaging (Casio Exilim EX-Z40, China), the stained lens, including iris, were placed in a glass bowl and photographs were made.

The intensity of staining was scored on a scale 1 to 5. The staining obtained by solution A was used as the standard and set to a score of 3. A score of 1 was used to indicate a staining much worse than solution A, a score of 2 was used to indicate a staining worse than solution A, a score of 3 was used to indicate a staining comparable to solution A, a score of 4 was used to indicate a staining better than solution A and a score of 5 was used to indicate a staining much better than solution A.

TABLE 2 staining test scores for staining porcine lens capsule (n = 4)

staining dye solution:

| | A | B | C | D | E | F | G | H | I | J |
|---|---|---|---|---|---|---|---|---|---|---|
| capsule 1 | 3 | 3 | 3 | 4 | 1 | 1 | 3 | 1 | 3 | 2 |
| capsule 2 | 3 | 3 | 3 | 3 | 5 | 5 | 3 | 1 | 3 | 2 |
| capsule 3 | 3 | 3 | 3 | 4 | 5 | 5 | 3 | 1 | 3 | 2 |
| capsule 4 | 3 | 3 | 3 | 4 | 5 | 5 | 4 | 1 | 4 | 2 |
| Average: | 3 | 3 | 3 | 4 | 4 | 4 | 3 | 1 | 3 | 2 |

Staining the lens capsule with solutions D, E and F (dye combination TB+CSB) resulted in the most intense staining. These solutions scored better on staining than solutions A and B, which contained a single dye, viz. TB.

Staining the lens capsules with solutions H and J (dye combinations TB+MB and CSB+MB) resulted in a much less intense staining compared to the other solutions.

Staining the lens capsules with solution G (dye combination TB+BBG) resulted in a staining intensity comparable to the single dye solutions with TB (solutions A and B).

From this example, it can be concluded that the combination of TB and CSB results in a superior staining intensity compared to the other dye combinations tested.

EXAMPLE 2: SYNERGETIC EFFECT TB+CSB IN THE ABSENCE OF HA

In view of the results of increased staining for the dye combination TB+CSB, an absorbance test was conducted to quantify this effect. It is hypothesized that TB and CSB interact with each other on a molecular level in solution, thereby influencing the absorbance maximum and intensity.

Solutions of TB, CSB and TB+CSB were prepared (samples 1-3). The samples were prepared as follows.

For sample 1, an amount of 25.33 µM of TB was dissolved in 1 mL phosphate buffered saline.

For sample 2, an amount of 32.87 µM of CSB was dissolved in 1 mL phosphate buffered saline.

For sample 3, an amount of 12.67 µM TB and 16.44 µM of CSB were dissolved in 1 mL phosphate buffered saline. Thus, the amount of TB and CSB used in sample 3 were half those used in samples 1 and 2.

Each solution was put in a cuvette and absorbance was measured using a spectrophotometer. Furthermore, a theoretical combined absorbance was determined by calculating the sum of the absorbances of 12.67 µM TB and 16.44 µM CSB using the relation between the absorbance and the concentration as measured in sample 1 and sample 2.

The results are shown in FIG. 1. FIG. 1 shows the three absorbance spectra measured for samples 1-3 (TB=continuous line; CSB=dotted line; physical mixture TB/CSB=bold dotted line), as well as the absorbance calculated by taking the sum of half the absorbance measured for sample 1 and half the absorbance measured for sample 2 (represented by the bold continuous line in FIG. 1).

From FIG. 1, two effects can be observed on the absorbance. First, FIG. 1 shows that the absorbance measured in the 500-610 nm region for sample 3 (TB/CSB mixture) was higher than the absorbance in the 500-610 nm region calculated from the absorbance measurements of samples 1 and 2 (sum of TB and CSB individually). Second, a shift in wavelength was observed for the maximum absorbance, such that the maximum occurred at a lower wavelength. The specific wavelength region wherein these changes occur correspond to the sensitive wavelength region in the eye. The human eye is most sensitive at a wavelength of 555 nm. Accordingly, both the increase in absorbance in the 500-600 region, as well as the shift in wavelength towards a lower value, are expected to contribute to an improved sensitivity in the eye toward the dye combination. Accordingly, it follows that the combination of TB+CSB shows better absorbance properties than could have been expected based on the individual absorbances measured for CSB and HA. It is hypothesized that this synergetic effect is the reason that the dye combination TB+CSB is perceived as having an increased intensity compared to TB or CSB alone.

Subsequently, the effect of gelatin was measured. A fourth sample was prepared similar to sample 3, except that 5 mg/ml gelatin was added as an additional compound to the sample (sample 4). Gelatin is a hydrolyzed collagen and was used to simulate the presence of collagen molecules in ocular tissue. As the dye will bind to the gelatin, this experiment simulates the binding of the dye to ocular tissue.

An absorbance spectrum was obtained for sample 4 that was similar in shape to the TB/CSB mixture (sample 3) in FIG. 1.

Figure 2:
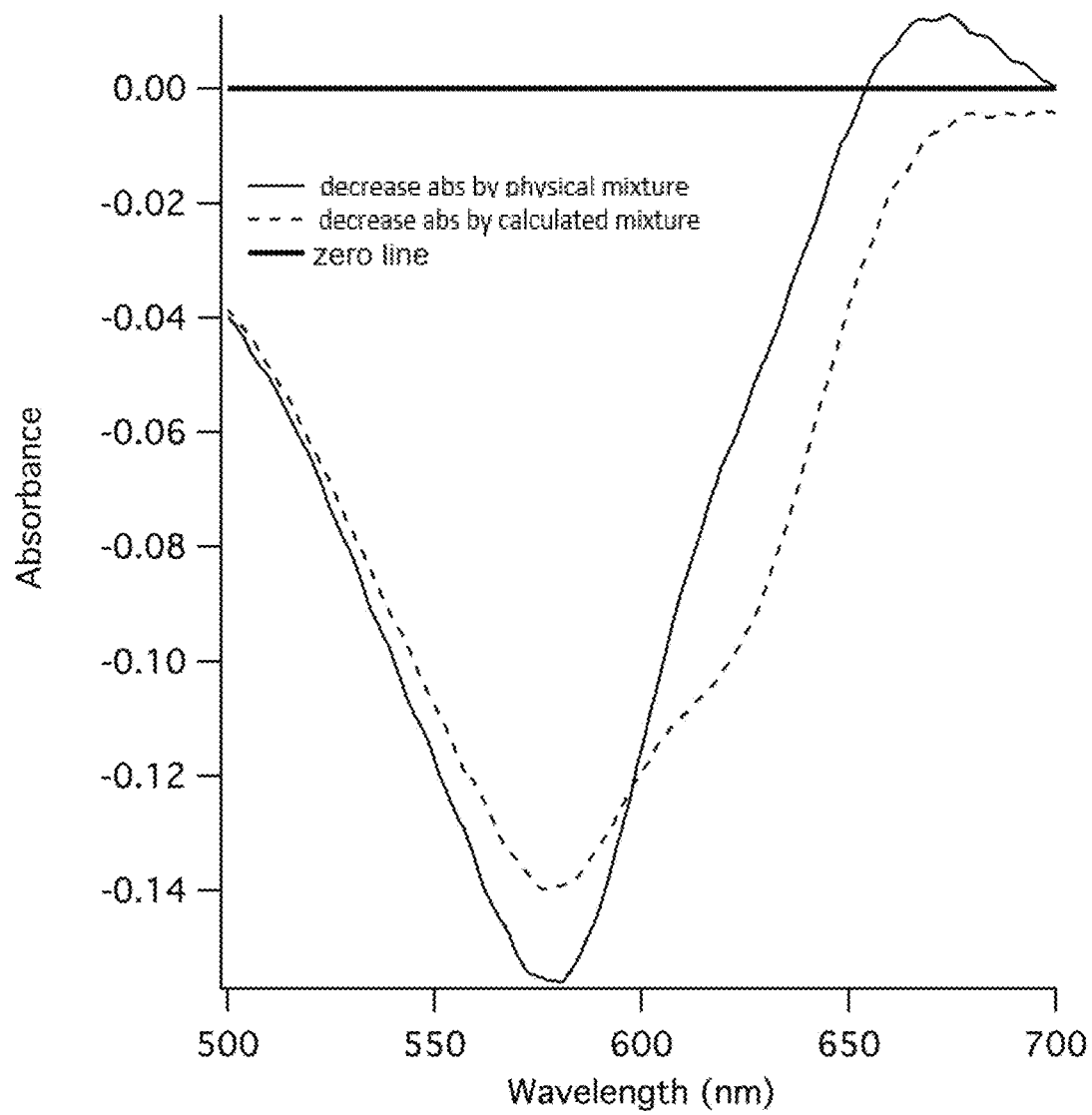

FIG. 2 shows the effect of gelatin on the absorbance of the dye combination TB+CSB. The two graphs in FIG. 2 represent difference spectra that were calculated from the absorbance spectrum of sample 4. The continuous line in FIG. 2 was obtained by subtracting the absorbance spectrum obtained for sample 3 (physical mixture, no gelatin) from the absorbance spectrum obtained for sample 4 (physical mixture, gelatin). The dotted line in FIG. 2 was obtained by subtracting the theoretical combined absorbance spectrum calculated from samples 1 and 2 (calculated sum, no gelatin) from the absorbance spectrum obtained for sample 4 (physical mixture, gelatin).

It can be concluded from FIG. 2 that the presence of gelatin has a positive effect on the absorbance of the dye combination TB+CSB. Thus, the staining intensity of the dye combination TB+CSB is even stronger when applied to the eye tissue than in a liquid solution of TB+CSB.

EXAMPLE 3: SYNERGETIC EFFECT TB+CSB IN THE PRESENCE OF HA

Example 2 was repeated with samples comprising hyaluronic acid (HA), in order to show that the synergetic effect observed for the dye combination TB and CSB also occurs in the presence of HA.

Solutions of TB, CSB and TB+CSB were prepared (samples 5-7). The samples were prepared as follows.

For sample 5, an amount of 32.85 µM of TB and 5 mg gelatin were dissolved in 1 mL phosphate buffered saline.

For sample 6, an amount of 36.53 µM of CSB and 5 mg gelatin was dissolved in 1 mL phosphate buffered saline.

For sample 7, an amount of 15.31 µM TB and 18.05 µM of CSB were dissolved in 1 mL phosphate buffered saline. Thus, the amount of TB and CSB used in sample 7 were about half those used in samples 5 and 6.

Furthermore, an amount of hyaluronic acid was dissolved in each sample such that it contained a 0.34 wt. % solution of HA. Each sample also contained 5 mg/ml gelatin.

Each solution was put in a cuvette and absorbance was measured using a spectrophotometer. Furthermore, a theoretical combined absorbance was determined by calculating the sum of the absorbances of 15.31 µM TB and 18.05 µM CSB using the relation between the absorbance and the concentration as measured in sample 5 and sample 6.

Figure 3:
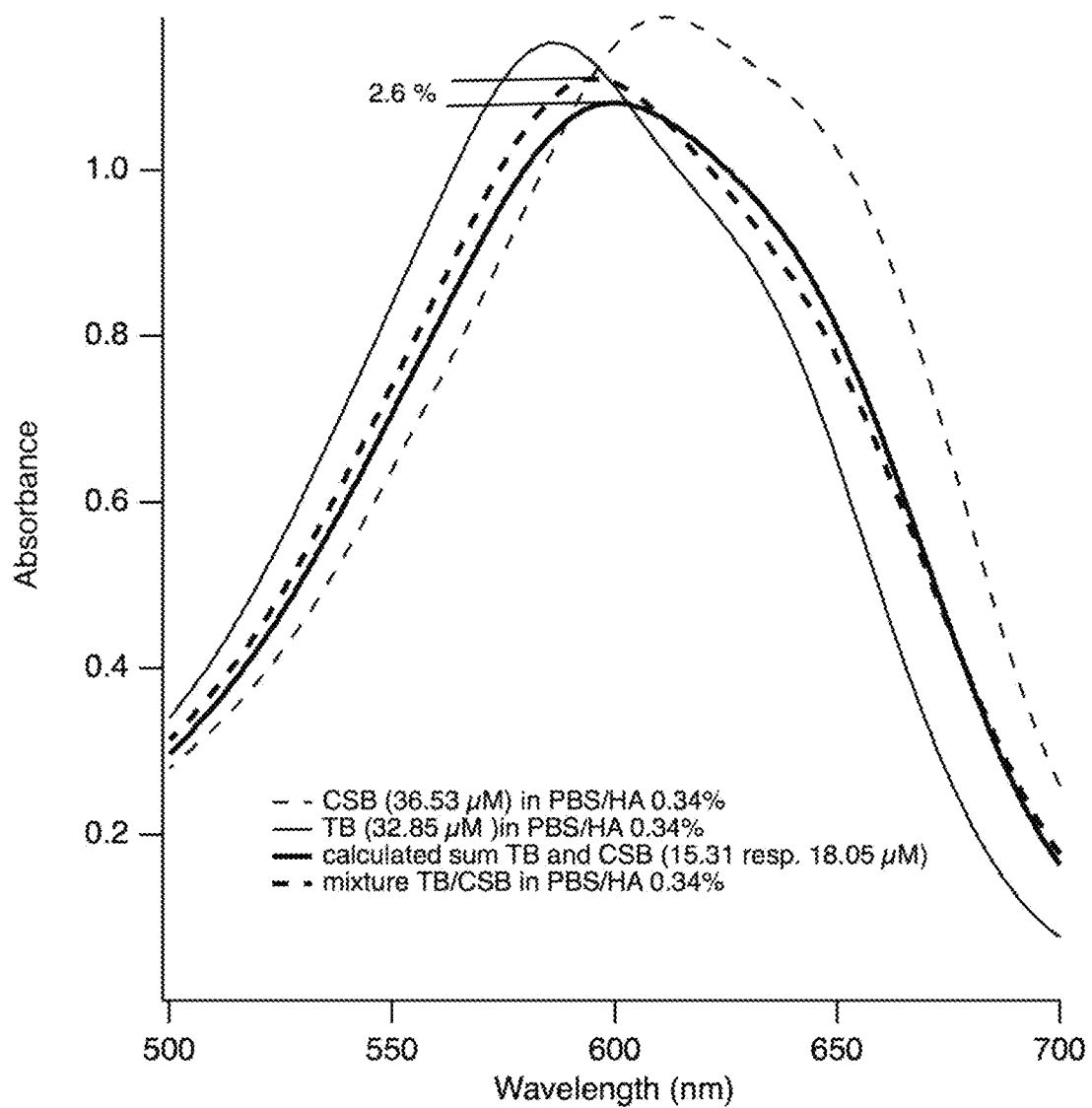

The results are shown in FIG. 3. FIG. 3 shows the three absorbance spectra measured for samples 5-7 (TB+HA=continuous line; CSB+HA=dotted line; physical mixture TB+CSB+HA=bold dotted line), as well as the theoretical combined absorbance ("calculated sum"—represented by the bold continuous line in FIG. 3). The theoretical combined absorbance was calculated by taking the sum of the absorbance of 15.31 µM TB using the molar absorbance coefficient of TB (as determined from the measured absorbance and known concentration in sample 5) and the absorbance of 18.05 µM CSB using the molar absorbance coefficient of CSB (as determined from the measured absorbance and known concentration of CSB in sample 6).

First, FIG. 3 shows that the absorbance in the 500-610 nm region was higher for sample 7 (TB/CSB mixture) than the absorbance in the 550-610 nm region calculated from the absorbance measurements of samples 5 and 6 (sum of TB and CSB individually). The specific wavelength region for which the absorbance is increased corresponds to the sensitive wavelength region in the eye. Therefore, the increase in intensity in this region is expected to result in an increase in perceived intensity.

Second, a shift in wavelength was observed for the maximum absorbance, such that the maximum occurred at a lower wavelength. The human eye is most sensitive at a wavelength of 555 nm. Accordingly, the shift in maximum towards a value closer to a wavelength of 555 nm is expected to result in an increase in perceived intensity.

Accordingly, it follows that the combination of TB+CSB shows better absorbance properties than could have been expected based on the individual absorbances measured for CSB and HA. It is hypothesized that this synergetic effect is the reason that the dye combination TB+CSB is perceived as having an increased intensity compared to TB or CSB alone.

EXAMPLE 4: EFFECT OF POLYMERS ON STAINING INTENSITY

The effect of polymer type on staining was determined by staining human lens capsules with various staining solutions comprising different types and amounts of polymer.

Ten different staining solutions were made comprising TB in an amount of 0.033 g/100 mL and CSB in an amount of 0.066 g/100 mL. Furthermore, nine of these staining solutions comprise one of the following polymers:

polyethylene glycol (PEG) with an average $M_w$ of 3350 Da polyethylene glycol (PEG) with an average $M_w$ of 35000 Da hyaluronic acid (HA) with a $M_w$ of 1200-2000 kDa hydroxypropyl methylcellulose (HPMC) with a $M_w$ of 86,000 polyvinylpyrrolidone (PVP with a $M_w$ of 10,000

The specific composition of the staining solutions are listed in Table 3.

TABLE 3 staining solution compositions

| Solution | polymer | polymer concentration (w/v %) | dye |
|---|---|---|---|
| 1 | PEG 3350 | 4 | TB + CSB |
| 2 | PEG 3350 | 20 | TB + CSB |
| 3 | PEG 35000 | 4 | TB + CSB |
| 4 | PEG 35000 | 20 | TB + CSB |
| 5 | HA | 0.4 | TB + CSB |
| 6 | HA | 0.65 | TB + CSB |
| 7 | HA | 0.8 | TB + CSB |
| 8 | HPMC | 1 | TB + CSB |
| 9 | PVP | 4 | TB + CSB |
| 10 | none | — | TB + CSB |

Twenty human cadaver eyes from twenty donors (mean donor age 74+10 years; range, 48-85 years) were used for this experiment. The donor globes were decontaminated and followed by corneal graft preparation with excision of the corneoscleral rims. The eyes were stored in saline solution (NaCl 0.9%) at 4-6° C. for 4-20 days. The lens capsule was harvested by cutting the sclera radially at four places (at 90° apart) in order to open the globe. A circumferential cut was performed to the ciliary body over 360°. The tissue containing the iris, the ciliary body and the lens was pulled out with a forceps and separated from the vitreous (if necessary, the scissors were used to cut the vitreous attached to the posterior lens capsule). The intact lens (containing its capsule) was then obtained, and the surrounding tissues (iris and ciliary body) were gently removed with two forceps.

Per staining solution, two human lens capsules were stained by immersing the lens in 2-5 ml dye solution for 10-15 s followed by rinsing with H$_2$O. Longer staining times (20-30 s) were used in case the staining solution was especially viscous (0.65% HA, 0.8% HA, 20% PEG 3350 and 20% PEG 35000). To evaluate the staining efficiency the lenses were placed in a petri dish, photographed, visually and biomicroscopically inspected and scored.

The intensity of staining was scored on a scale of 1 to 5 and was based on visual inspection of the lens capsules and represented different staining intensities:
1. uncolored; comparable to native lens color;
2. some staining
3. good staining
4. very good staining
5. excellent staining The results are shown in Table 4.

TABLE 4 staining test scores for staining human lens capsule (n = 2)

| | staining solution | | | | | | | | | |
|---|---|---|---|---|---|---|---|---|---|---|
| | 1 | 2 | 3 | 4 | 5 | 6 | 7 | 8 | 9 | 10 |
| capsule 1 | 3 | 2 | 2 | 2 | 4 | 5 | 3 | 2 | 2 | 4 |
| capsule 2 | 2 | 2 | 1 | — | 5 | 5 | 3 | — | 1 | 3 |
| average | 2.5 | 2 | 1.5 | 2 | 4.5 | 5 | 3 | 2 | 1.5 | 3.5 |

During staining in 0.65% HA solution (Solution 6), one of the lens capsules ruptured and during the washing step it became completely detached from the lens. However, no subsequent staining of the lens itself was observed. This unintended event confirms that the staining solution selectively stained the lens capsule and not the underlying lens.

The most intense staining was obtained using Solution 5 (0.4% HA) and Solution 6 (0.65% HA). The higher concentration of HA (0.8%) in Solution 7 made the solution extremely viscous and difficult to handle; the lens did not submerge into the staining solution by itself and more manipulation was needed to uniformly cover the dye. The eventual staining obtained was poor.

All four staining solutions with PEG (Solutions 1-4) resulted in considerably less intense staining than the staining solutions with HA. Staining with Solution 8 (1% HPMC) and Solution 9 (4% PVP) showed very poor results. It is hypothesized that these polymers inhibit staining to some degree, probably by competing either for binding to the dyes or to the binding sites of the proteins.

It can be concluded that staining solutions comprising TB, CSB and HA are able to provide an increased staining intensity to the human lens capsule compared to staining solutions comprising TB, CSB and a different polymer, such as PEG, HPMC or PVP.

EXAMPLE 5: ABSORBANCE TESTS ON POLYMER EFFECT ON STAINING INTENSITY TB+CSB

In view of the results of the staining behavior for the dye-polymer combinations tested in Example 4, an absorbance test was conducted to quantify the effect of the polymer. This example shows the effect of different polymers on the absorbance of the dye combination TB+CSB, as well as the effect of gelatin (which resembles collagen present in ocular tissue).

The absorbance spectra of solutions of TB+CSB with one of HA, PEG and HPMC was measured (samples B, C and D) and compared with the absorbance spectrum of a solution of TB+CSB without polymer (sample A) and the absorbance spectrum calculated by taking the average sum of the absorbance measured for TB and CSB individually (described in Example 2 and 3 above).

Four samples were prepared. All samples contained a solution of TB and CSB dissolved in a phosphate buffer (PBS), using similar concentration as were used in Example 2 and 3. Further, each sample contained 5 mg gelatin per ml sample solution. The samples were different from each other in the amount and type of polymer present:
sample A (reference): no polymer
sample B: hyaluronic acid (0.34 wt. %)
sample C: HPMC (0.36 wt. %)
sample D: PEG 3350 (1.84 wt. %)

The absorbance of these four samples was measured. The absorbance spectra of these samples is not shown, but are similar in shape as those depicted in FIG. 1. The results of the absorbance measurements is depicted in FIGS. 4-6.

Figure 4:
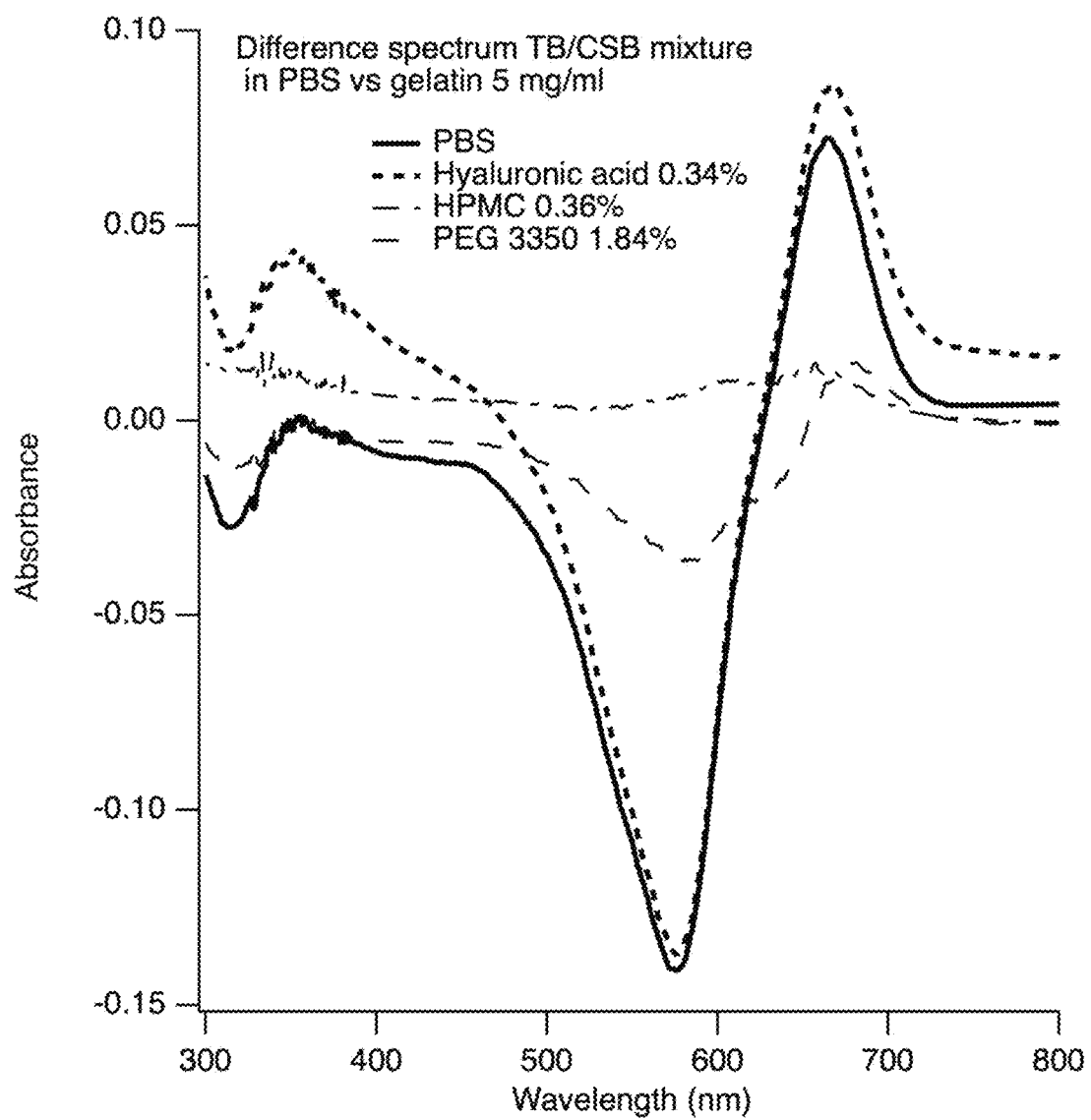

FIG. 4 shows the effect of polymer on the absorbance of the dye combination TB+CSB in the presence of gelatin. For each of samples A-D, a difference spectrum was calculated by subtracting the absorbance spectrum obtained for sample 3 (physical mixture, no gelatin) from the absorbance spectrum measured for samples A-D. These four difference spectra are depicted in FIG. 5.

From FIG. 4 it can be concluded that hyaluronic acid has a positive effect on the absorbance of the dye combination TB+CSB, whereas both HPMC and PEG3350 have a negative effect. This explains the reduced staining intensity observed in Example 4.

Figure 5:
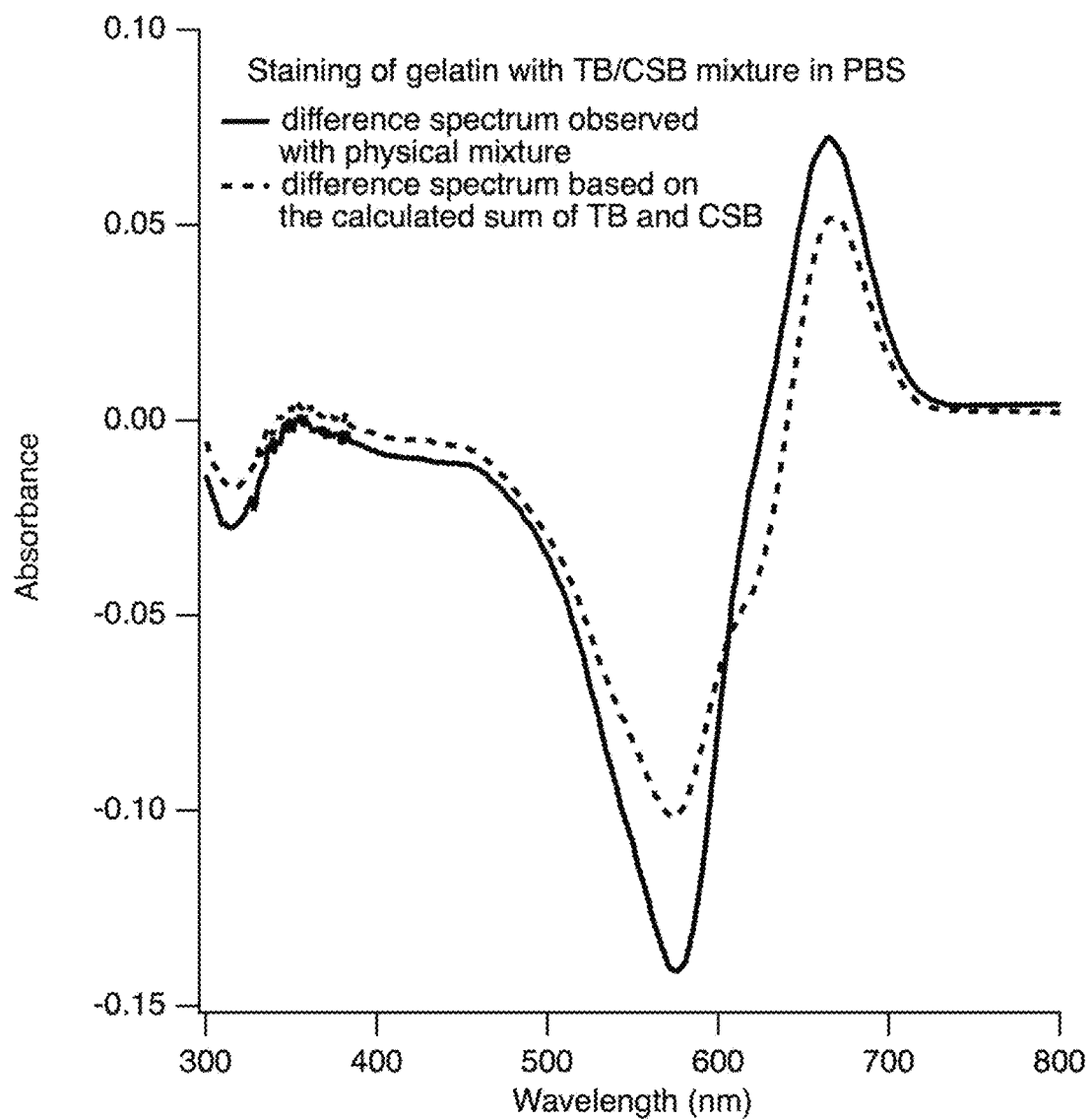
Figure 6:
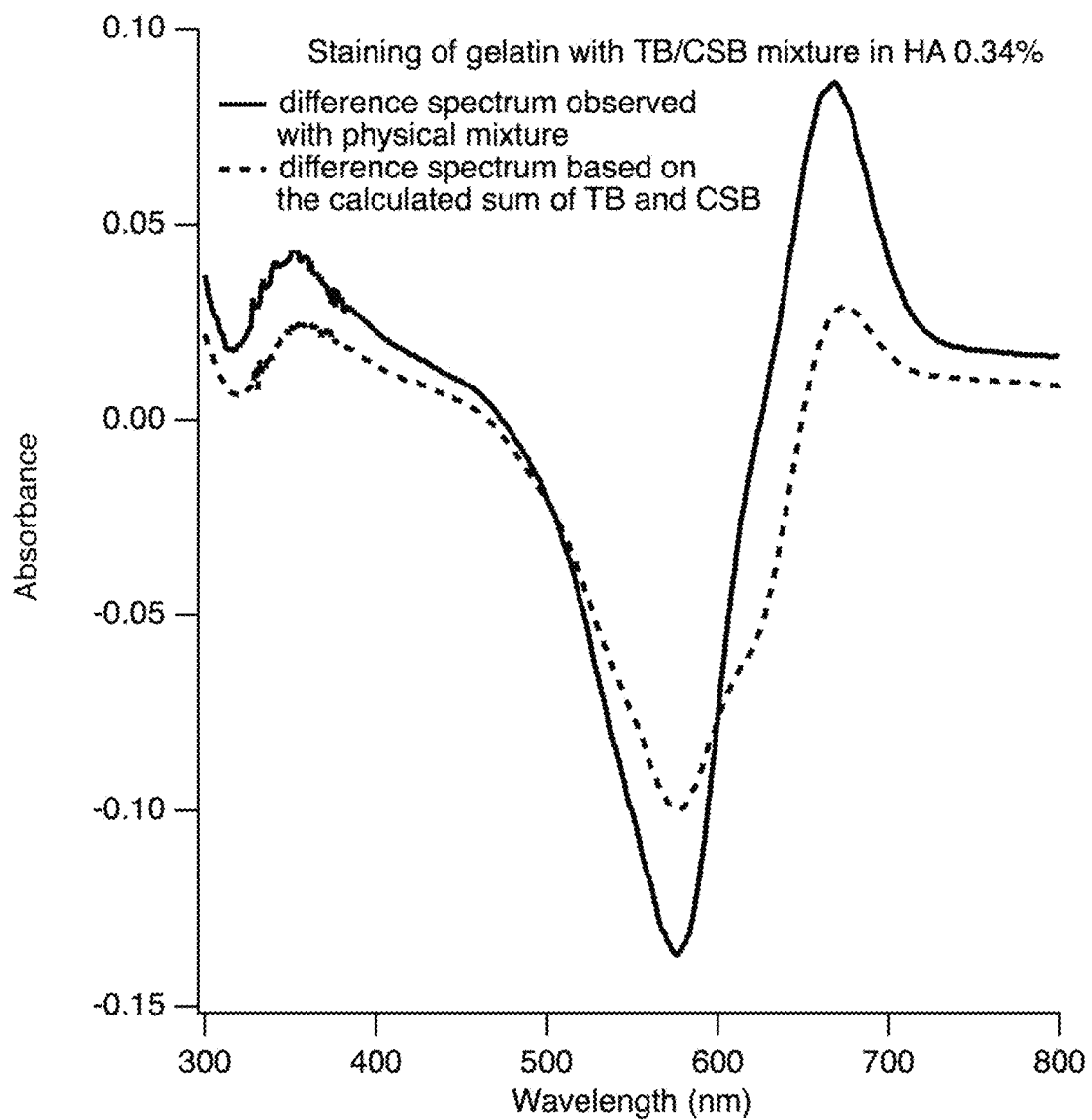

FIG. 5 shows the effect of gelatin on the absorbance of the dye combination TB+CSB. The continuous line in FIG. 5 was obtained by subtracting the absorbance spectrum obtained for sample 3 (physical mixture, no gelatin) from the absorbance spectrum obtained for sample A (reference, gelatin). The dotted line in FIG. 5 was obtained by subtracting the theoretic combined absorbance spectrum calculated from samples 1 and 2 (HA, no gelatin) from the absorbance spectrum obtained for sample A (reference, gelatin).

It can be concluded from FIG. 5 that the presence of gelatin has a positive effect on the absorbance of the dye combination TB+CSB. Thus, the staining intensity of the dye combination TB+CSB is even stronger when applied to the eye tissue than in a liquid solution of TB+CSB.

FIG. 6 shows the effect of HA on the absorbance of the dye combination TB+CSB. The continuous line in FIG. 6 was obtained by subtracting the absorbance spectrum obtained for sample 3 (physical mixture, no gelatin) from the absorbance spectrum obtained for sample B (HA, gelatin). The dotted line in FIG. 5 was obtained by subtracting the theoretic combined absorbance spectrum calculated from samples 1 and 2 (no gelatin) from the absorbance spectrum obtained for sample B (HA, gelatin).

It can be concluded from FIG. 6 that the presence of HA and gelatin together has a positive effect on the absorbance of the dye combination TB+CSB. Thus, the staining intensity of the composition according to the invention is even stronger when applied to the eye tissue than in the liquid composition itself.

When comparing FIGS. 5 and 6, it can be observed that the increase in absorbance (compared to the calculated combined TB+CSB absorbance) is higher in FIG. 6 than it is in FIG. 5, especially at the maximum. The absorbance maximum of the continuous line for sample B in FIG. 6 (668 nm, absorbance 0.08639) is significantly higher than the absorbance maximum of the continuous line for sample A in FIG. 5 (665 nm, absorbance 0.0725). Accordingly, it can be concluded that the presence of HA has a positive effect on the absorbance of the dye combination TB+CSB.

Summarizing, this Example shows that the staining intensity of the dye combination TB+CSB is increased by the presence of hyaluronic acid. This is surprising, as other polymers such as PEG and HPMC have a negative effect. Further, it can be concluded that the dye combination has an improved staining intensity when contacted with eye tissue (as simulated by gelatin).

EXAMPLE 6: CLINICAL STUDY IN CATARACT SURGERY

A clinical test was conducted to evaluate the staining capacity of staining solutions comprising a dye combination of Trypan Blue (TB), Chicago Sky Blue (CSB) and hyaluronic acid (HA) on human lens capsules. Different concentrations of TB, CSB and HA were used and the staining intensity and duration of the dye solution evaluated.

All samples were based on a neutral isotonic phosphate buffered solution comprising water (1 L), NaCl (8.2 g), $Na_2HPO_4 \cdot 2H_2O$ (1.9 g) and $NaH_2PO_4 \cdot 2H_2$) (0.3 g) and having a pH between 7.3 and 7.45 and an osmolality in the range of 257-314 mOsm/kg. The concentration of TB, CSB and HA of the different samples is shown in Table 5. The molecular weight of HA was in the range of 1200-2000 kDa. The amounts are given in weight percentage and are based on the total weight of the staining solution.

TABLE 5 staining compositions used in clinical tests

| | Trypan Blue Concentration (wt. %) | Chicago Sky Blue Concentration (wt. %) | Hyaluronic Acid Concentration (wt. %) |
|---|---|---|---|
| Sample A | 0.033 | 0.066 | 0.55 |
| Sample B | 0.033 | 0.066 | 0.60 |
| Sample C | 0.033 | 0.066 | 0.65 |
| Sample D | 0.033 | 0.066 | 0.70 |
| Sample E | 0.033 | 0.066 | 0.75 |
| Sample F | 0.033 | 0.066 | 0.80 |
| Sample G | 0.020 | 0.040 | 0.65 |
| Sample H | 0.06 | 0 | 0 |

The different samples were clinically tested by three different surgeons. The surgeons applied the samples as a staining composition to stain the human lens capsule during cataract surgery. Sample H corresponded to the staining solution that was used at the time by the surgeons in cataract surgery.

The cataract surgery either made use of extracapsular cataract extraction or phacoemulsification. The staining solution was gently applied to the frontal lens capsule using a blunt cannula. No air bubble was injected in the anterior chamber during surgery. The anterior chamber was subsequently irrigated in order to remove any excess dye.

The parameters that were evaluated by the surgeons were the staining intensity (poor/average/good/excellent), duration of the staining effect (poor/average/good/excellent), and the injectability, i.e. ease of the injection (poor/average/good/excellent). The results are shown in Table 6.

TABLE 6 overview of clinical results

| | Staining intensity | Duration of staining | Injectability |
|---|---|---|---|
| Sample A | Good | Poor | Excellent |
| Sample B | Good | Average | Good |
| Sample C | Good | Good | Good |
| Sample D | Good | Good | Poor |
| Sample E | Good | Good | Poor |
| Sample F | Good | Good | Poor |
| Sample G | Poor | Poor | Poor |
| Sample H | Average | Poor | Excellent |

It can be concluded from the clinical evaluation that the staining compositions according to the invention have better staining intensity and improved duration of staining compared to the staining composition currently used in the art (sample H).

An especially good duration was obtained using a HA concentration of 0.65-0.8 wt. %. This was noticeable by an intense contrast that lasted until the very end of the surgery, which typically is 10 minutes. The staining intensity was good when using a TB concentration higher than 0.02 wt. %.

The staining compositions according to the invention provided an intense contrast even if no air bubble was injected. Being able to skip the use of the air bubble means less handling for the surgeon and hence less time consumption. The injection and subsequent removal of an air bubble typically adds 30 seconds to 1 minutes on a total duration of a cataract surgery of 10-15 minutes. Also, as with any surgical handling, there is always a risk that complications may arise.

The invention claimed is:

1. A method of ocular surgery comprising 1) staining an ocular tissue or part thereof with a staining composition comprising Chicago Sky Blue and Trypan Blue as the only vital dyes and hyaluronic acid, wherein the weight ratio of Trypan Blue to Chicago Sky Blue is between 1:3 and 3:1, and 2) performing surgery on the stained ocular tissue or its surrounding tissue.

2. The method of claim 1, wherein the ocular surgery is cataract surgery, and wherein the method comprises staining the lens capsule with the staining composition and subsequently removing of the lens.

3. The method of claim 2, wherein the lens capsule is to be stained by applying the staining composition to the outer surface of the lens capsule.

4. The method of claim 2, wherein the cataract surgery comprises the steps of
opening the anterior chamber of the eye; and
optionally injecting an air bubble in the anterior chamber; and
optionally injecting a viscoelastic liquid in the anterior chamber; and
staining the lens capsule; and
creating an opening in the lens capsule; and
removing the lens from the lens capsule, while leaving the lens capsule sufficiently intact; and
placing a synthetic lens in the lens capsule.

5. The method of claim 2, wherein no air bubble is injected into the anterior chamber during the surgery.

6. The method of claim 1, wherein the hyaluronic acid is present in an amount less than 0.8 wt. %, based on the total weight of the staining composition.

7. The method of claim 1, wherein the weight ratio of Trypan Blue to Chicago Sky Blue is between 1:3 and 2:1.

8. The method of claim 1, wherein the weight ratio of Trypan Blue to Chicago Sky Blue is between 1:1 and 3:1.

9. The method of claim 1, wherein the combined Trypan Blue and Chicago Sky Blue concentration in the staining composition is 0.02-0.2 wt. %.

10. The method of claim 1, wherein the combined Trypan Blue and Chicago Sky Blue concentration in the staining composition is 0.04-0.1 wt. %.

11. The method of claim 1, wherein the staining composition comprises 0.2-0.75 wt. % hyaluronic acid.

12. The method of claim 1, wherein the hyaluronic acid has a molecular weight of between 100,000 to 5,000,000 Da.

* * * * *